(12) United States Patent
Lin et al.

(10) Patent No.: US 9,354,712 B2
(45) Date of Patent: May 31, 2016

(54) RECOGNITION DEVICE, INTELLIGENT DEVICE AND INFORMATION PROVIDING METHOD FOR HUMAN MACHINE INTERACTION

(71) Applicant: INSTITUTE FOR INFORMATION INDUSTRY, Taipei (TW)

(72) Inventors: Ching-Wen Lin, New Taipei (TW); Cheng-Huan Chen, Taipei (TW); Wei-Ming Chiang, New Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 0 days.

(21) Appl. No.: 14/555,711

(22) Filed: Nov. 28, 2014

(65) Prior Publication Data

US 2016/0062472 A1   Mar. 3, 2016

(30) Foreign Application Priority Data

Aug. 28, 2014   (TW) .............................. 103129726 A

(51) Int. Cl.
*G06F 3/01* (2006.01)
*H04N 5/232* (2006.01)
*G06F 17/30* (2006.01)

(52) U.S. Cl.
CPC .......... *G06F 3/017* (2013.01); *G06F 17/30047* (2013.01); *H04N 5/23216* (2013.01)

(58) Field of Classification Search
CPC .............. G06F 3/017; G06F 17/30047; H04N 5/23216

USPC ....................................................... 348/222.1
See application file for complete search history.

(56) References Cited

U.S. PATENT DOCUMENTS

| 2014/0118257 | A1* | 5/2014 | Baldwin | ................. G06F 3/017 345/158 |
| 2014/0143785 | A1* | 5/2014 | Mistry | ................. G06F 1/3203 718/104 |
| 2014/0184854 | A1* | 7/2014 | Musatenko | ........ H04N 5/23296 348/240.2 |
| 2014/0349256 | A1* | 11/2014 | Connor | .............. G09B 19/0092 434/127 |

* cited by examiner

*Primary Examiner* — Gevell Selby
(74) *Attorney, Agent, or Firm* — CKC & Partners Co., Ltd.

(57) ABSTRACT

An intelligent device is configured to provide relevant information related to an image. The intelligent device includes a sensor module, an activation module, an image capture module, an image recognition module, and an information providing module. The sensor module includes a magnetometer and a gyroscope. The magnetometer detects a direction of a gesture relative to the intelligent device. The gyroscope detects at least one angular velocity of the gesture. The activation module determines the gesture according to the direction and the angular velocities, and generates an activating signal according to the gesture determined. The image capture module captures the image according to the activation signal. The image recognition module identifies the image to retrieve relevant information related to the image. The information providing module provides the relevant information.

20 Claims, 6 Drawing Sheets

RECOGNITION DEVICE, INTELLIGENT DEVICE AND INFORMATION PROVIDING METHOD FOR HUMAN MACHINE INTERACTION

RELATED APPLICATIONS

This application claims priority to Taiwan Application Serial Number 103129726, filed Aug. 28, 2014, which is herein incorporated by reference.

BACKGROUND

1. Field of Invention

The present disclosure relates to a recognition device, intelligent device, and information providing method. More particularly, the present disclosure relates to a recognition device, intelligent device, and information providing method for human machine interaction.

2. Description of Related Art

As information technology develops rapidly, machines have become an integral part of our daily life. A considerable amount of research has been devoted to improving machines to be operated more efficiently so as to increase productivity.

Human Machine Interface is the medium of information exchange, communication and interaction between machines and their operators, and has evolved from text-based to graphic-based with the advancement of computing power and related technology. Conventional mouse and keyboard are no longer the only option for a user interface. More intuitive interfaces such as touch-based and voice controlled interface have emerged on the market, and soon become popular with the users for their ease to use and learn.

However, the intuitive human machine interfaces mentioned above still require users to switch the machine into a command-receiving mode when the users intend to input a command, thus causing inconvenience and reducing naturalness of user experience.

SUMMARY

An aspect of the present disclosure is directed to a recognition device disposed in an intelligent device for determining a gesture. The recognition device includes a sensor module and an activation module. The sensor module includes a magnetometer configured for measuring a direction and a gyroscope configured for measuring at least one angular velocity. The activation module is configured for determining the gesture according to the direction and the at least one angular velocity, and activates an image capturing function of the intelligent device according to the gesture.

Another aspect of the present disclosure is directed to an intelligent device. The intelligent device includes a sensor module, an activation module, an image capturing module, an image recognition module, and an information providing module. The sensor module includes a magnetometer configured for measuring a direction and a gyroscope configured for measuring at least one angular velocity. The activation module is configured for determining the gesture according to the direction and the at least one angular velocity, and generating an activation signal according to the gesture. The image capturing module is configured for capturing an image when receiving the activation signal from the activation module. The image recognition module is configured for recognizing content of the image captured by the image capturing module to retrieve relevant information related to the image. The information providing module is configured for providing the relevant information retrieved by the image recognition module.

Yet another aspect of the present disclosure is directed to an information providing method for providing relevant information related to an image with an intelligent device. The information providing method includes the following steps: measuring a direction and at least one angular velocity of the intelligent device, determining a gesture according to the direction and the at least one angular velocity, generating an activation signal according to the gesture, capturing an image when receiving the activation signal, recognizing content of the image to retrieve relevant information related to the image, and providing the relevant information.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
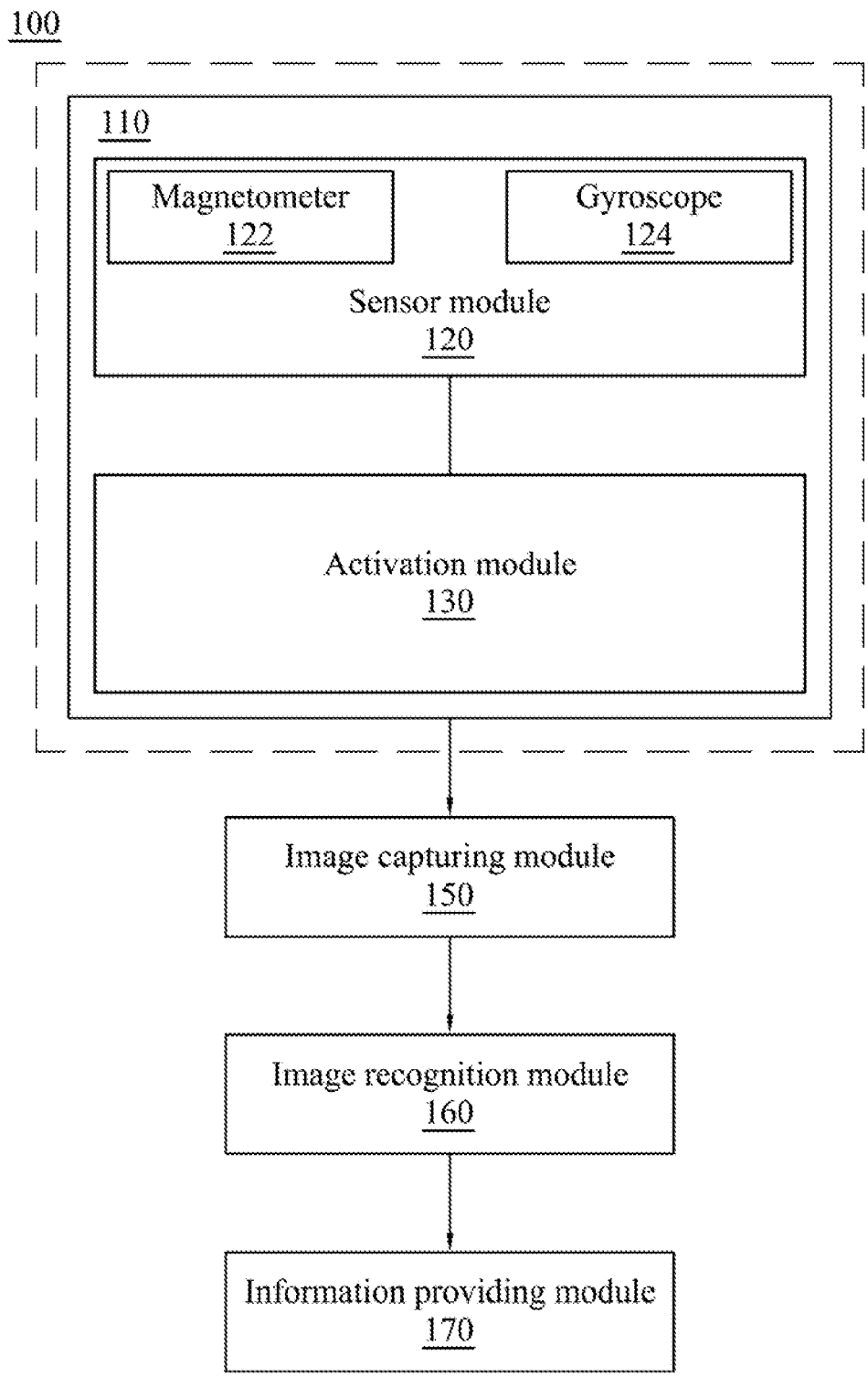
FIG. 1 is a schematic block diagram of an intelligent device and recognition device according to a first embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic block diagram of an intelligent device and recognition device according to a first embodiment of the present disclosure. The intelligent device 100 includes the recognition device 110, an image capturing module 150, an image recognition module 160, and an information providing module 170. The recognition device 110 is connected to the image capturing module 150. The image capturing module 150 is connected to the image recognition module 160. The image recognition module 160 is connected to the information providing module 170.

The recognition device 110 includes a sensor module 120 and an activation module 130. The sensor module 120 includes multiple sensors to measure various aspects of a gesture made by the user of the intelligent device 100. The gesture described herein may include a movement of the hands, head, part of body or the combination above. The activation module 130 determines whether to generate an activation signal according to the data measured by the sensors in the sensor module 120. The image capturing module 150 captures an image of the surrounding environment upon receiving the activation signal from the activation module 130. The image recognition module 160 recognizes content of the image to retrieve relevant information related to the image, and the information providing module 170 provides the relevant information to the user wearing the intelligent device 100. Details of the operation of each module are given below.

In the first embodiment, the sensor module 120 includes a magnetometer 122 and a gyroscope 124. The magnetometer 122 measures a direction, and the gyroscope 124 measures at least one angular velocity.

The magnetometer 122 is also called a Gaussmeter, and measures a direction and strength of the magnetic field at a point in space. There are various types of magnetometers categorized according to the hardware implementation and functionality. In one embodiment, the magnetometer 122 is a 2D E-compass implemented with inductive pickup coils. In another embodiment, the magnetometer 122 is a 3D E-compass implemented with Hall effect sensor.

The gyroscope 124 is configured for measuring angular velocities, and measures up to three axes depending on the implementation. In one embodiment, the gyroscope 124 is a conventional gyroscope. In another embodiment, the gyroscope 124 is an MEMS gyroscope. In yet another embodiment, the gyroscope 124 is an optical fiber gyroscope.

The activation module 130 determines whether the gesture of the user indicates the user remains a constant facing direction according to the direction measured by the magnetometer 122 and the at least one angular velocity measured by the gyroscope 124. In the present embodiment, the activation module 130 is a microprocessor, a microcontroller, or an integrated circuit. When the gesture indicates that the user remains a constant facing direction, it also indicates that the user pays attention to or expresses interest in some object in that facing direction.

Figure 2:
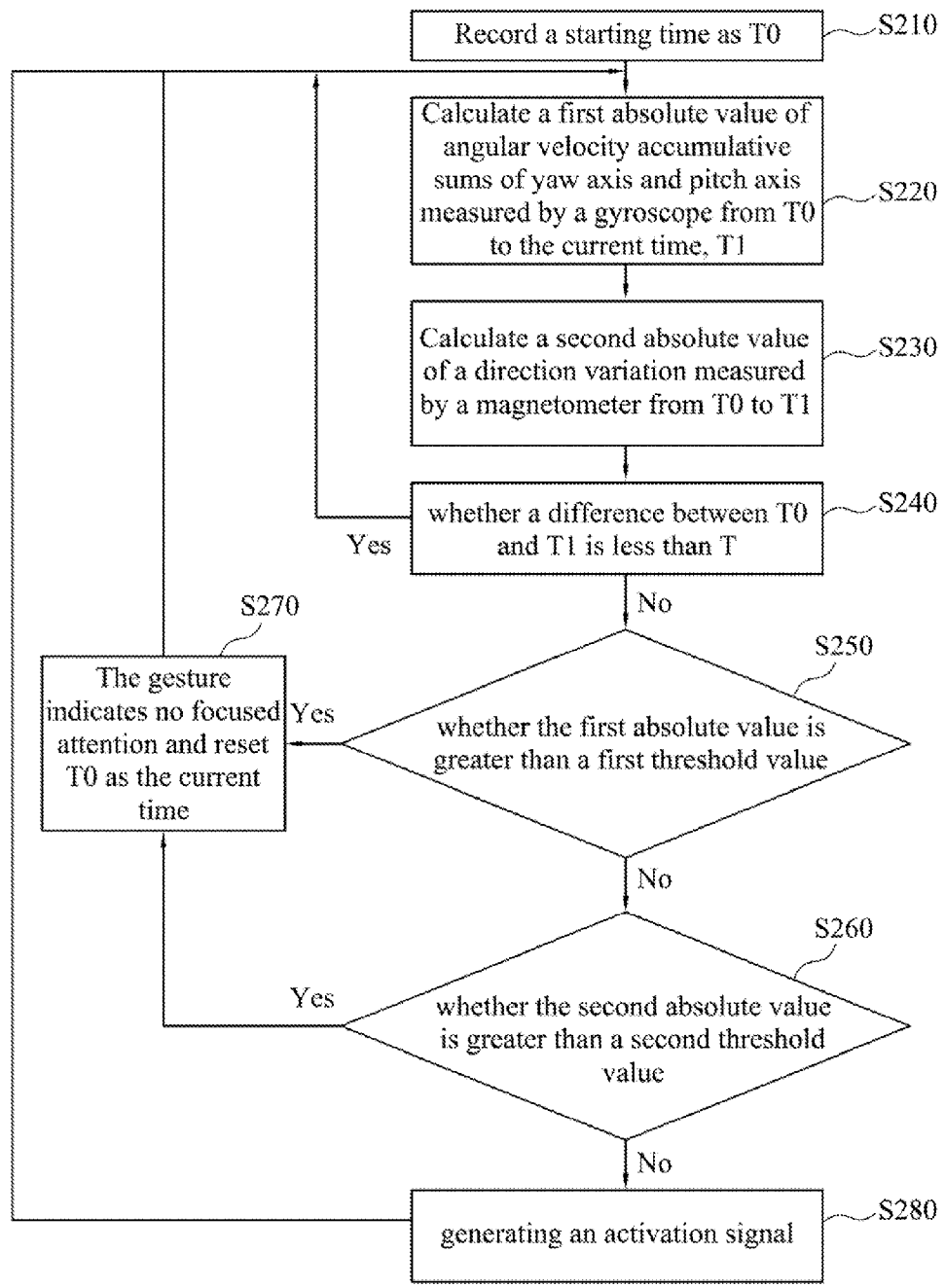
FIG. 2 is a flow chart of gesture determination according to the first embodiment of the present disclosure.

FIG. 2 is a flow chart of gesture determination according to the first embodiment of the present disclosure, and gives details about how the activation module 130 determines the gesture with the data measured by the sensor module 120.

In operation S210, the activation module 130 records a starting time T0 when it starts reading the measurement data from the magnetometer 122 and the gyroscope 124. In operation S220, the activation module 130 calculates an angular velocity accumulative sum about the pitch axis from the starting time T0 to the current time T1, denoting as Vs1, and another angular velocity accumulative sum about the yaw axis from the starting time T0 to the current time T1, denoting as Vs2, with the measurements from the gyroscope 124. The activation module 130 calculates a first absolute value of angular velocity accumulative sums of the pitch axis and yaw axis with $\sqrt{(Vs1^2+Vs2^2)}$. In operation S230, the activation module 130 calculates a second absolute value of a direction variation measured by the magnetometer 122 from the starting time T0 to the current time T1.

In operation S240, the activation module 130 computes a difference between the starting time T0 and the current time T1. When the difference is smaller than a predetermined duration T, then the activation module 130 goes back to the operation S220 to continue gathering the measurement data from the magnetometer 122 and the gyroscope 124. When the difference is greater than the predetermined duration T, then the activation module 130 proceeds to execute operation S250.

In operation S250, the activation module 130 compares the first absolute value with a first threshold value, and in operation S260, the second absolute value is compared with a second threshold value.

In the above two operations, when the first absolute value is greater than the first threshold or the second absolute value is greater than the second threshold value, it indicates that the user does not keep a constant facing direction, which also indicates lack of interests to a particular object in the surrounding environment. Therefore, the activation module 130 executes operation S270 to reset the starting time T0 as the current time to keep monitoring the gesture of the user.

When both the operation 5250 and the operation S260 generates no as the output, it indicates that the first absolute value and the second absolute value are smaller than the first threshold value and the second threshold value, respectively. In other words, the user has maintained a constant facing direction for longer than the predetermined duration T.

The predetermined duration T is customized according to application scenarios or the user preference. In one embodiment, the predetermined duration T is set as 2 seconds. Therefore, the activation module 130 determines that the user pays focused attention after the user faces the same direction for more than 2 seconds, and the response time is 2 seconds. In another embodiment, the predetermined duration T is set as 5 seconds. An increase in the predetermined duration T results in slower response than the previous embodiment, but avoids false positive in determining whether the user pays focused attention. In yet another embodiment, the predetermined duration T for the activation module 130 is customizable for the user.

The first threshold value is compared with the first absolute value of the angular velocities measured by the gyroscope 124, and thus is set according to the precision of the gyroscope 124 and the predetermined duration T. In one embodiment, the gyroscope 124 is an MEMS gyroscope with a precision of 0.1 deg/s. When the predetermined duration T is 3 seconds, the first threshold value is set as 0.4 deg/s. When the predetermined duration T is 4 seconds, the first threshold value is set as 0.57 deg/s. In another embodiment, the gyroscope 124 is an optical fiber gyroscope with a precision of 0.01 deg/s. When the predetermined duration T is 3 seconds, the first threshold value is set to be 0.04 deg/s. When the predetermined duration T is 4 seconds, the first threshold value is set to be 0.057 deg/s.

The second threshold value is set according to the precision of the magnetometer 122. In one embodiment, the magnetometer 122 is a digital compass with a precision of 1 degree, and the second threshold value is set as 2 degrees to avoid errors caused by the measurement error. In another embodiment, the magnetometer 122 is a digital compass with higher precision, 0.5 degree, and the second threshold value is set as 1 degree. The aforementioned numbers are by examples, and should not be used to limit the present disclosure.

On the other hand, when the first absolute value is smaller than the first threshold value and the second absolute value is smaller than the second threshold value, the activation module 130 determines the gesture as remaining a constant facing direction indicating focused attention of the user, and performs the operation S280 to generate the activation signal. The image capturing module 150 is configured to capture an image upon receiving the activation signal, so as to include the object that draws the attention of the user in the image. The image recognition module 160 recognizes the content of the image and retrieves the relevant information related to the image.

In one embodiment, the image capturing module 150 is a spy camera. In another embodiment, the image capturing module 150 is a wireless mini camera.

The image recognition module 160 receives the image taken by the image capturing module 150, and processes the image with machine vision to extract useful features from the image for analysis and identification and retrieve the relevant information related to the image. In the present embodiment, the image recognition module 160 is a microprocessor, a microcontroller or a system-on-chip. In one embodiment, the image recognition module 160 recognizes the texts in the image to retrieve the relevant information related to the image. In another embodiment, the image recognition module 160 matches the image to known image data to retrieve the relevant information.

The information providing module 170 receives the relevant information from the image recognition module 160, and provides the relevant information to the user wearing the intelligent device 100. In the present embodiment, the information module 170 is a microprocessor, a microcontroller, or a system-on-chip.

In one embodiment, the information providing module 170 includes a display to visually present the relevant information when the relevant information is of video or image format. In another embodiment, the information providing module 170 includes a set of speakers to play the relevant information when the relevant information is of audio format.

Figure 3:
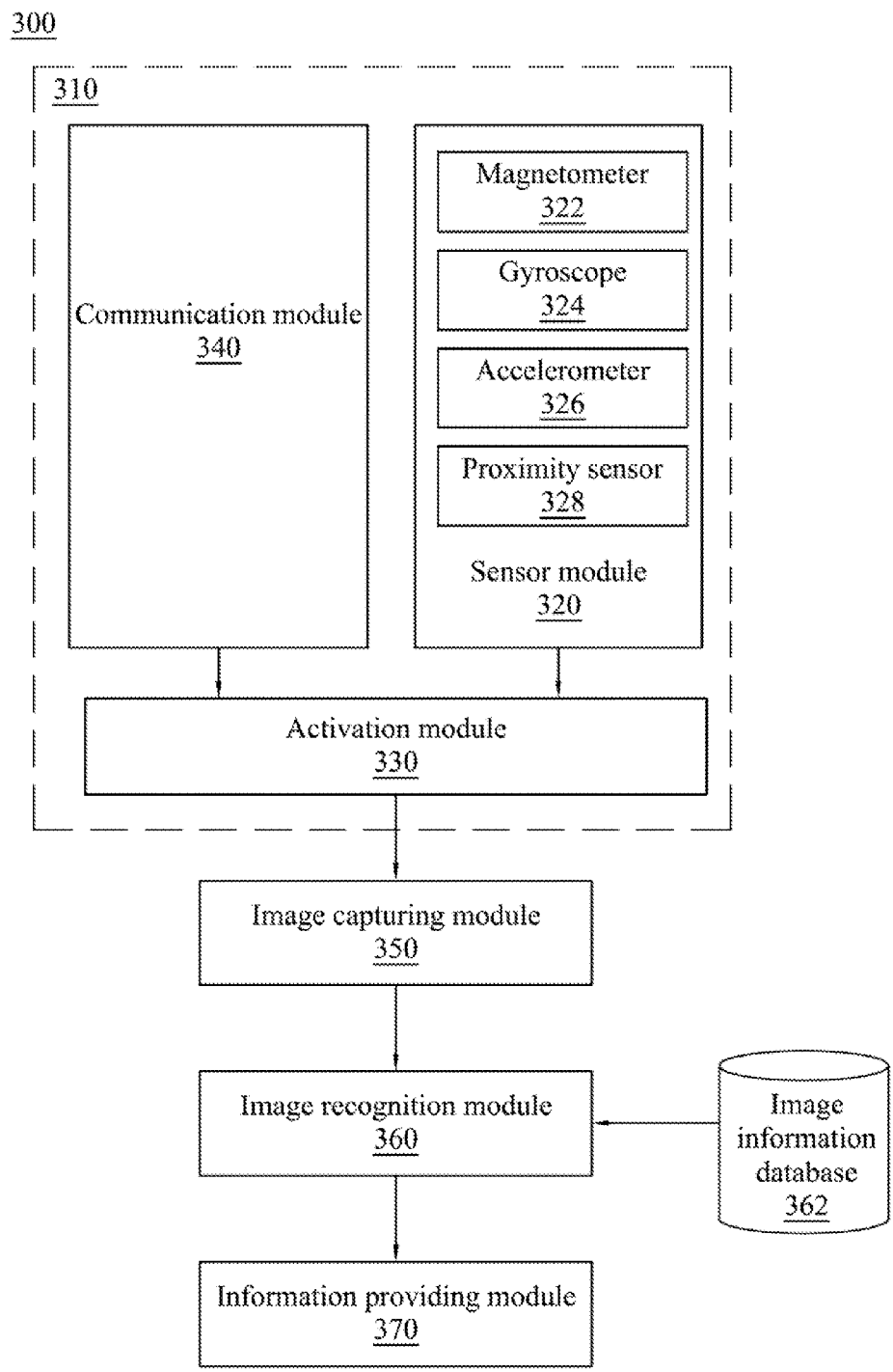
FIG. 3 is a schematic block diagram of an intelligent device and recognition device according to a second embodiment of the present disclosure.

FIG. 3 is a schematic block diagram of an intelligent device and recognition device according to a second embodiment of the present disclosure. An intelligent device 300 includes a recognition device 310, an image capturing module 350, an image recognition module 360, and an information providing module 370. The connection and operation thereof are similar to those illustrated in the aforementioned embodiments, and thus are not further detailed herein.

In the present embodiment, the sensor module 320 in the recognition device 310 further includes an accelerometer 326 and a proximity sensor 328 in addition to a magnetometer 322 and a gyroscope 324. With additional measurement data from the accelerometer 326 and the proximity sensor 328, the activation module 330 in the recognition device 310 determines more aspects of the gesture than the facing direction.

In one embodiment, the accelerometer 326 measures acceleration of he gesture of the user, and the activation module 330 determines whether the gesture is associated with positional displacement. If the gesture is associated with no displacement, then the user substantially remains still. The activation module 330 generates the activation signal under this condition, such that the image capturing module 350 does not capture blurry images unrecognizable for the image recognition module 360 when the intelligent device 300 is in motion. The accelerometer 326 is a piezoresistive accelerometer, a capacitive accelerometer, or a thermal accelerometer.

In another embodiment, the activation module 330 receives a detection result from the proximity sensor 328 indicating the presence or absence of an obstacle in front of the intelligent device 300, and determines the gesture according to the detection result. The activation module 330 generates the activation signal when the gesture indicates the user remains a constant facing direction with the presence of an obstacle within the detecting range of the proximity sensor 328. Therefore, the image taken by the image capturing module 350 contains a clear image of the object with sufficient information for the task of the image recognition module 360. The proximity sensor 328 is an inductive sensor, a capacitive sensor, a laser rangefinder, or an eddy-current sensor.

The recognition device 310 of the intelligent device 300 also includes a communication module 340. The communication module 340 communicates with a beacon to determine a position of the intelligent device 300, and the activation module 330 generates the activation signal according to the position and the gesture. For example, the intelligent device 300 determines whether the intelligent device 300 is in a specified area by utilizing the communication module 340 to communicate with the beacon. When the intelligent device 300 is in the specified area and the gesture indicates the user remains a constant facing direction, the activation module 330 generates the activation signal. The communication module 340 is a Bluetooth module, a WiFi module, or an Infrared module.

The image recognition module 360 of the intelligent device 300 also includes an image information database 362. Multiple entries of image data and their associated information are stored in the image information database 362. The image recognition module 360 receives the image captured by the image capturing module 350, matches the image to the entries of image data in the image information database 362, and retrieves the associated information of the matched entry as the relevant information. The information providing module 370 provides the relevant information to the user of the intelligent device 300.

In one embodiment, the entries of image data about the environment inside the coverage of the beacon are stored in the image information database 362. Once the user wearing the intelligent device 300 enters the covered area of the beacon, the activation module 330 determines the position of the intelligent device 300 with the communication module 340, and generates the activation signal according to the position and the gesture determined according to the measurement data received from the sensor module 320.

The sensor module 320 can incorporate other types of sensors, and the activation module 330 can be implemented with different algorithms of gesture determination to utilize measurement data from different sensors. The characteristics of different sensors complement each other to achieve precise gesture determination and accurate user intention identification, so as to provide a natural and effortless user experience.

The activation module 130/330, the image recognition module 160/360, and the information providing module 170/370 can be implemented as software, hardware, or firmware. For example, when the processing speed and accuracy are priority concerns, hardware/firmware implementations are preferable. When design flexibility is the top concern, software implementation is in favor. Moreover, the aforementioned modules can be implemented as combinations of software, hardware, and firmware. The examples are only for explanation and should not be used to limit the scope of the present disclosure. Those skilled in the art can design the implementation according to their needs after reading the present disclosure. For example, all of the aforementioned modules can be combined with a central processor. Moreover, the information database 362 is implemented on a storage device, such as a hard disk, or any other non-transitory computer readable storage medium.

Figure 4:
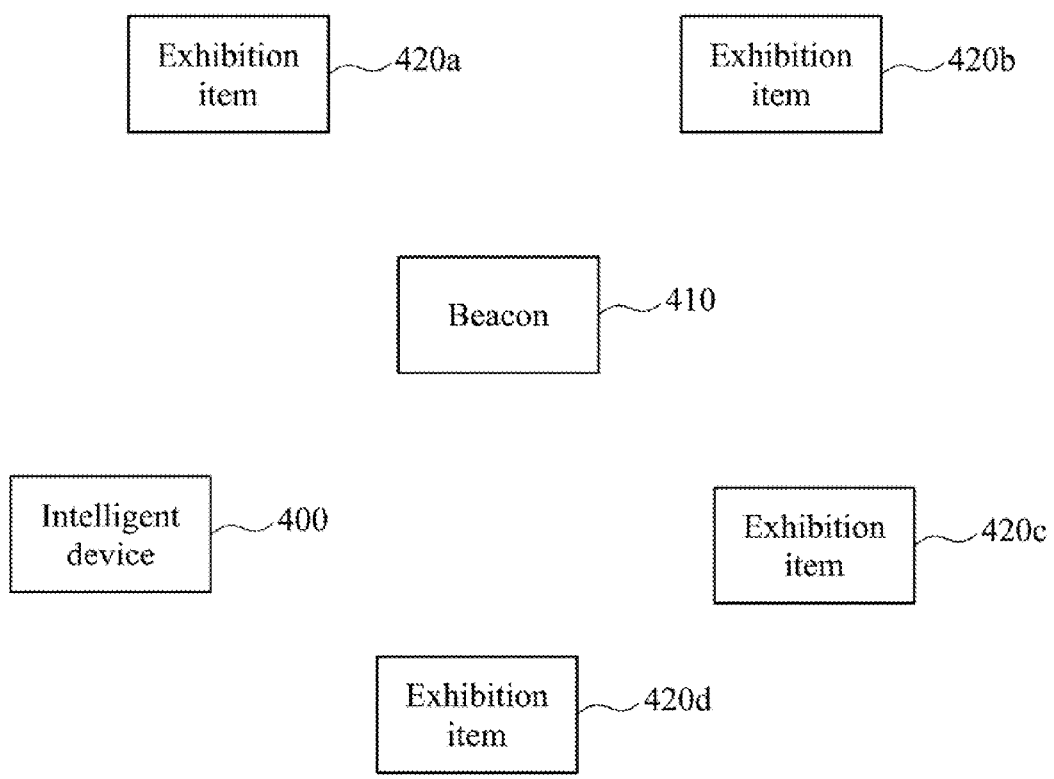
FIG. 4 is a schematic diagram of a use case scenario of the intelligent device according to a third embodiment of the present disclosure.

FIG. 4 is a schematic diagram of a use case scenario of the intelligent device according to a third embodiment of the present disclosure. A user visiting an exhibition wears an intelligent device 400. A beacon 410 and several exhibition items 420a-420d are installed in the exhibition venue. Multiple entries of image data of the exhibition items 420a-420d and the associated information are stored in the intelligent device 400. The intelligent device 400 determines that the user is located in the exhibition venue when the intelligent device 400 is within the coverage of the beacon 410. When the intelligent device 400 is in the coverage, the intelligent device 400 captures an image when the gesture indicates the user remains still and a constant facing direction, and an obstacle is present in front of the intelligent device 400. The image captured is then recognized by the intelligent device 400 to determine if any of the exhibition items 420a-420d is in the image, and provides the associated information of the exhibition items 420a-420d in the image. The number of exhibition items is only by example, and the present disclosure is not limited hereto.

Figure 5:
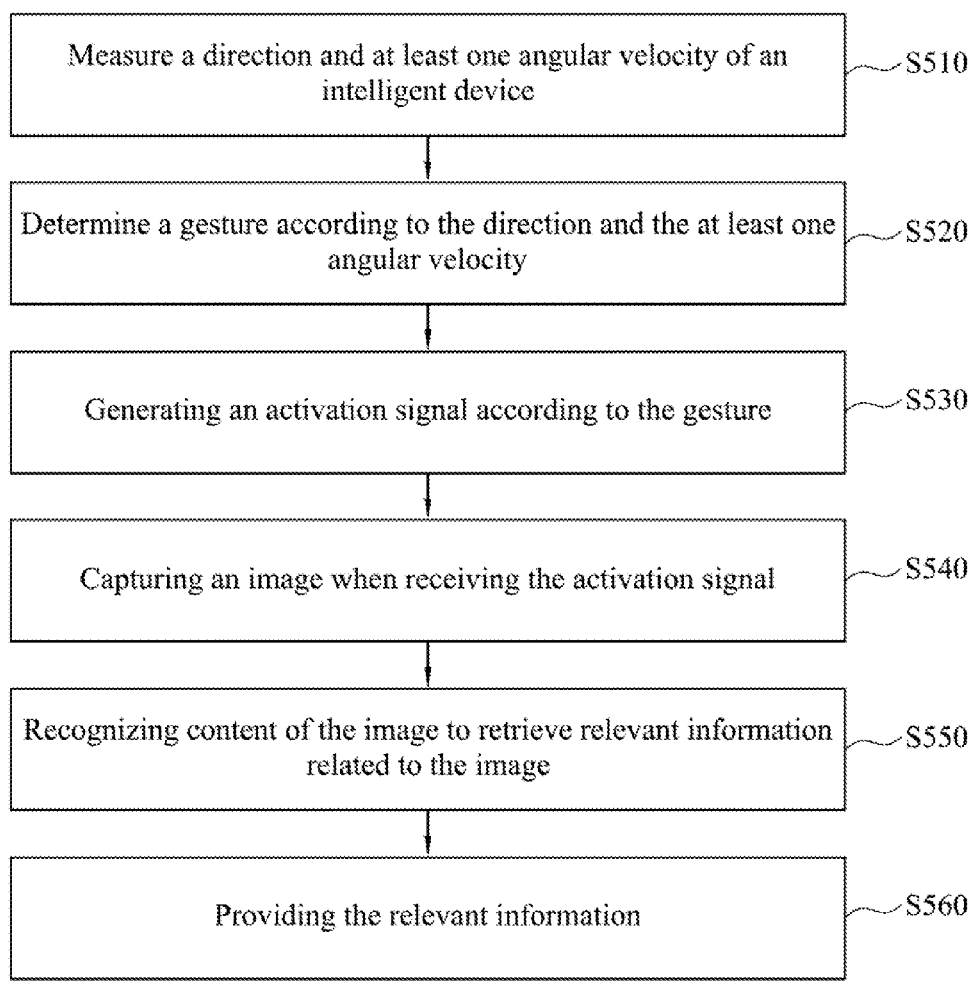
FIG. 5 is a flow chart of an information providing method according to a fourth embodiment of the present disclosure.

FIG. 5 is a flow chart of an information providing method according to a fourth embodiment of the present disclosure. For the ease of understanding and clarity, the descriptions for the information providing method 500 takes the intelligent device 300 as an example, but the disclosure is not limited hereto. While the process flow described below includes a number of operations that appear to be in a specific order, it should be apparent that these operations may include more or fewer operations, which may be executed serially or in parallel (e.g., using parallel processors or in a multi-threading environment).

In operation S510, a direction and at least one angular velocity of the intelligent device 300 are measured. In operation S520, a gesture of a user wearing the intelligent device 300 is determined according to the direction and the at least one angular velocity. In one embodiment, one aspect of the gesture is whether the user remains a constant facing direction. The details of the operation S520 are given in the accompanying text of FIG. 2, and not repeated herein.

In operation S530, an activation signal is generated according to the gesture. In one embodiment, the activation signal is generated when the gesture indicates that the user remains the same facing direction. In another embodiment, the activation signal is generated when the gesture indicates the user is nodding or shaking his/her head, or other movements related to the direction and the angular velocities.

In operation S540, an image is captured when the activation signal is received. In one embodiment, the image is preprocessed for the next operation, such as sharpening, denoising, or auto white balancing, etc.

In operation S550, content of the image captured in operation S540 is recognized for retrieving relevant information related to the image. In one embodiment, the relevant information is retrieved by matching the image with the entries of the image data stored in the image information database 362.

In operation S560, the relevant information retrieved in operation S550 is provided. In one embodiment, a display is used to visually present the relevant information when the relevant information is in image or video format. In another embodiment, a set of speakers is used to play the relevant information when the relevant information is in audio format. In yet another embodiment, the relevant information is played with a set of speakers and a TTS engine when the relevant information is in text format.

The information providing method 500 frees the exhibition visitors from button pressing when they intend to obtain information from the exhibition guidance devices. The exhibition visitors approach a piece of exhibition item and remain still and facing the same direction to appreciate the exhibition item, and then the guidance device implemented with the information providing method 500 captures an image of the exhibition item, recognizes the image, and provides the relevant information to the exhibition visitors. The exhibition visitors do not have to distract themselves from the exhibition items, and thus it improves the user experience considerably.

Figure 6:
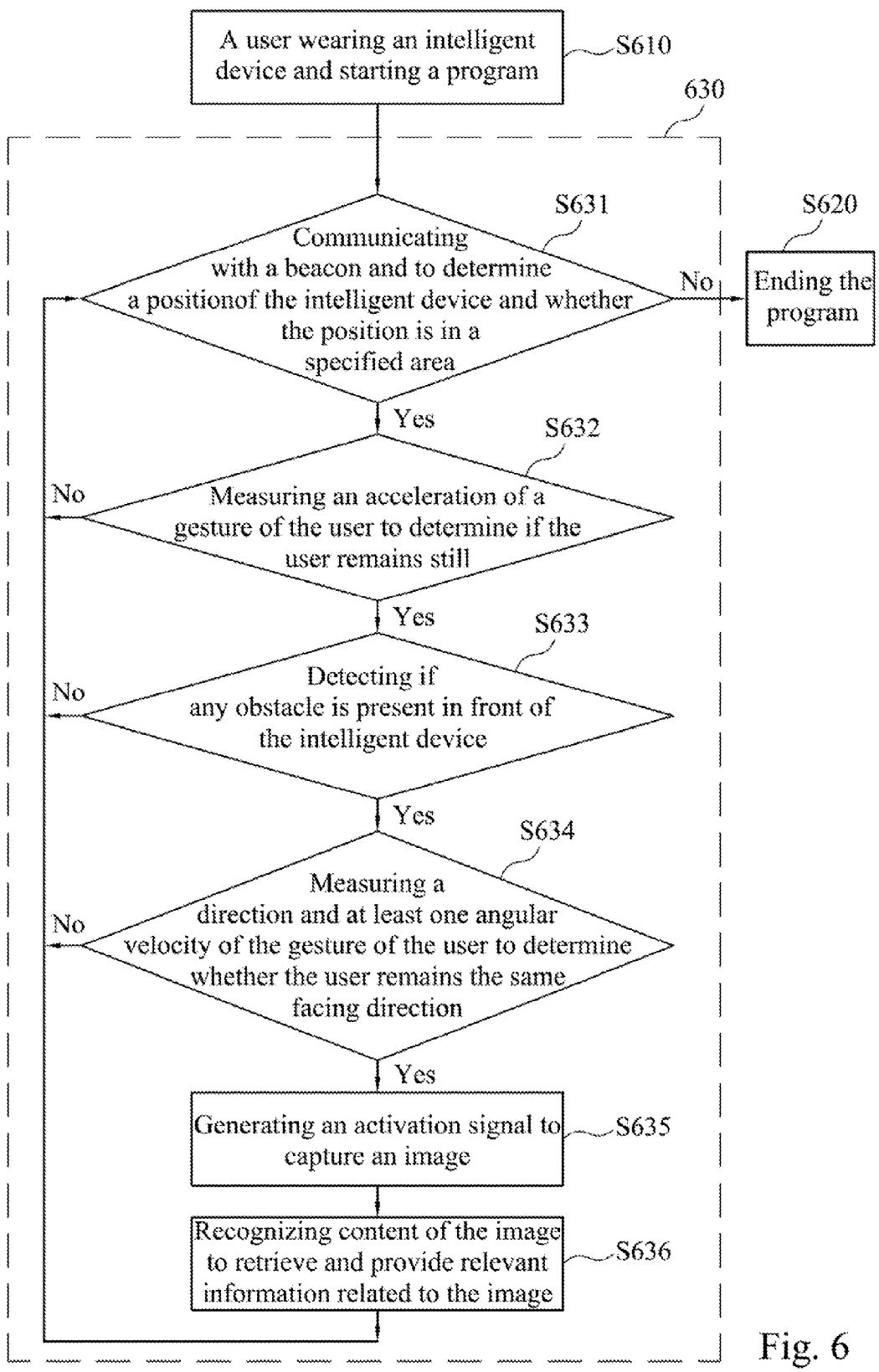
FIG. 6 is a flow chart of user operation of the intelligent device according to a fifth embodiment of the present disclosure.

FIG. 6 is a flow chart of user operation of the intelligent device according to a fifth embodiment of the present disclosure. For the ease of understanding and clarity, the descriptions for the user operation take the intelligent device 300 as an example, but the disclosure is not limited hereto. While the process flow described below includes a number of operations that appear to be in a specific order, it should be apparent that these operations may include more or fewer operations, which may be executed serially or in parallel (e.g., using parallel processors or in a multi-threading environment).

In operation S610, the user wears the intelligent device 300 and starts a software program. The software program is a machine instruction set implemented to execute an information providing method 630. The operation S631 to operation S636 are the operations performed by the information providing method 630 implemented as the software program. The software program is stored in a non-transitory computer readable medium, and a computer reads the non-transitory computer readable medium to execute the information providing method 630 on the intelligent device 300.

In operation S631, a position of the intelligent device 300 is determined through communicating with a beacon, and the execution of the following operations depend on whether the position is in a specified area. In one embodiment, the specified area is an exhibition venue. In another embodiment, multiple entries of image data about a predetermined region are stored in the image information database 362 of the information providing method 630, and thus the specified area is set as the predetermined region defined in the image information database 362.

In the present embodiment, when the position of the intelligent device 300 is not in the specified area, the operation S620 is performed to end the software program. In this way, computing resources and energy of the intelligent device 300 may be reduced.

If the position of the intelligent device 300 is in the specified area, an acceleration of a gesture of the user is measured to determine if the gesture is associated with any positional displacement (S632). When the gesture of the user indicates the user is in motion, no focused attention from the user is detected. When the gesture of the user is stillness, operation S633 is executed.

The presence or absence of an obstacle in front of the intelligent device 300 is detected in operation S633. When an obstacle is detected in front of the intelligent device 300, it implies the obstacle is within the range of the proximity sensor 328, and operation S634 is executed.

In operation S634, a direction and at least one angular velocity are measured to determine whether the gesture indicates the user remains a constant facing direction. When the recognition device 310 determines that the user remains a constant facing direction, the gesture indicates that an object in the facing direction attracts the attention of the user and also that the object is within the range of the proximity sensor 328, and the gesture is associated with no positional displacement. The details of the operation S634 is as described in the accompanying texts of FIG. 2, and not further detailed herein.

With the operations S632-S634, the recognition device 310 determines the user is paying focused attention to the object, and the intelligent device 300 executes the operation S635 to generate an activation signal to capture an image including the object that draws attention of the user. In operation S636, the content of the image is recognized and the relevant information related to the image of the object is retrieved and provided to the user.

The intelligent device 300 can be additionally combined with a pair of glasses, a set of earphones, a cap, or any wearable garment for convenience of carrying. The application scenarios are not limited to exhibitions. The intelligent device 300 is also applicable to scenarios of indoor shopping malls. When the user wearing the intelligent device 300 approaches a shop and stops in front of the shop, the intelligent device 300 captures an image of the shop sign, recognizes the image, and provide sale information of this particular shop or other similar shops in the mall to the user. The intelligent device 300 in the present disclosure provides a user interface that allows the user to control, to input command or to activate the image capturing function effortlessly in all application scenarios.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of the present disclosure provided they fall within the scope of the following claims.

What is claimed is:

1. A recognition device disposed in an intelligent device for determining a gesture, comprising:
   a sensor module, comprising:
   a magnetometer configured for measuring a direction;
      a gyroscope configured for measuring at least one angular velocity; and
   an activation module configured for determining the gesture according to the direction and the at least one angular velocity, and activates an image capturing function according to the gesture
      wherein the activation module calculates at least one angular velocity accumulative sum according to the at least one angular velocity, and calculates a first absolute value of the at least one angular velocity accumulative sum, and activates the image capturing function of the intelligent device when the first absolute value is smaller than a first threshold value.

2. The recognition device of claim 1, wherein the activation module further executes the following instructions:
   calculating a direction variation according to the direction; and
   activating the image capturing function of the intelligent device according to the at least one angular velocity accumulative sum and the direction variation.

3. The recognition device of claim 2, wherein the activation module calculates a second absolute value of the direction variation, and activates the image capturing function of the intelligent device when the second absolute value is smaller than a second threshold value.

4. The recognition device of claim 1, further comprising:
   a communication module configured for communicating with a beacon to determine a position of the intelligent device, the activation module activates the image capturing function of the intelligent device according to the position and the gesture.

5. The recognition device of claim 1, wherein the sensor module comprises an accelerometer configured for measuring acceleration, and the activation module determines the gesture according to the acceleration.

6. The recognition device of claim 1, wherein the sensor module comprises a proximity sensor configured for generating a detection result of presence of an obstacle in front of the intelligent device, and the activation module determines the gesture according to the detection result.

7. An intelligent device, comprising
   a sensor module, comprising:
   a magnetometer configured for measuring a direction;
   a gyroscope configured for measuring at least one angular velocity; and
   an activation module configured for determining a gesture according to the direction and the at least one angular velocity, and generating an activation signal according to the gesture, wherein the activation module calculates at least one angular velocity accumulative sum according to the at least one angular velocity, and calculates a first absolute value of the at least one angular velocity accumulative sum, and generates the activation signal when the first absolute value is smaller than a first threshold value;
   an image capturing module configured for capturing an image when receiving the activation signal;
   an image recognition module configured for recognizing content of the image to retrieve relevant information related to the image; and
   an information providing module configured for providing the relevant information.

8. The intelligent device as claimed in claim 7, wherein the activation module further executes the following instructions:
   calculating a direction variation according to the direction; and
   generating the activation signal according to the at least one angular velocity accumulative sum and the direction variation.

9. The intelligent device as claimed in claim 8, wherein the activation module calculates a second absolute value of the direction variation, and generates the activation signal when the second absolute value is smaller than a second threshold value.

10. The intelligent device as claimed in claim 7, further comprising:
   a communication module configured for communicating with a beacon to determine a position of the intelligent device, the activation module generates the activation signal according to the position and the gesture.

11. The intelligent device as claimed in claim 7, wherein the sensor module comprises an accelerometer configured for measuring acceleration, and the activation module determines the gesture according to the acceleration.

12. The intelligent device as claimed in claim 7, wherein the sensor module comprises a proximity sensor configured for generating a detection result of presence of an obstacle in front of the intelligent device, and the activation module determines the gesture according to the detection result.

13. The intelligent device as claimed in claim 7, further comprising:
   an image information database configured for storing the relevant information, wherein the image recognition module searches the image information database with the image to recognize the content of the image and retrieve the relevant information related to the image.

14. An information providing method for providing relevant information related to an image with an intelligent device, comprising:
   measuring a direction and at least one angular velocity of the intelligent device;
   determining a gesture according to the direction and the at least one angular velocity;
   generating an activation signal according to the gesture further comprising;

calculating at least one angular velocity accumulative sum according to the at least one angular velocity;

calculating a first absolute value of the at least one angular velocity accumulative sum; and generating the activation signal when the first absolute value is smaller than a first threshold value;

capturing an image when receiving the activation signal;

recognizing content of the image to retrieve relevant information related to the image; and providing the relevant information.

15. The information providing method as claimed in claim 14, wherein the operation of generating the activation signal further comprises:

calculating a direction variation according to the direction; and generating the activation signal according to the at least one angular velocity accumulative sum and the direction variation.

16. The information providing method as claimed in claim 15, wherein the operation of generating the activation signal comprises:

calculating a second absolute value of the direction variation: and generating the activation signal when the second absolute value is smaller than a second threshold value.

17. The information providing method as claimed in claim 14, wherein the operation of generating the activation signal comprises:

generating the activation signal according to a position of the intelligent device and the gesture, wherein the position is determined through communicating with a beacon.

18. The information providing method as claimed in claim 14, further comprising:

measuring acceleration to determine the gesture according to the acceleration.

19. The information providing method as claimed in claim 14, further comprising:

generating a detection result of presence of an obstacle in front of the intelligent device, and determining the gesture according to the detection result.

20. The information providing method as claimed in claim 14, wherein operation of recognizing the content of the image to retrieve relevant information related to the image comprises:

accessing and searching an image information database on the intelligent device to recognize the content of the image and retrieve the relevant information related to the image.

* * * * *